United States Patent
Salsich et al.

(10) Patent No.: US 10,939,507 B2
(45) Date of Patent: Mar. 2, 2021

(54) INDUCTION HEATING ACCESSORIES

(71) Applicant: ILLINOIS TOOL WORKS INC., Glenview, IL (US)

(72) Inventors: Anthony V. Salsich, Appleton, WI (US); Gregg Prochnow, Hortonville, WI (US); Kevin McWithey, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 362 days.

(21) Appl. No.: 15/928,268

(22) Filed: Mar. 22, 2018

(65) Prior Publication Data

US 2018/0213612 A1 Jul. 26, 2018

Related U.S. Application Data

(63) Continuation-in-part of application No. 15/235,383, filed on Aug. 12, 2016, now Pat. No. 10,609,770.

(51) Int. Cl.
| | | |
|---|---|---|
| *H05B 6/04* | (2006.01) | |
| *H05B 6/10* | (2006.01) | |
| *H05B 6/36* | (2006.01) | |
| *H05B 6/06* | (2006.01) | |

(Continued)

(52) U.S. Cl.
CPC ............. *H05B 6/101* (2013.01); *H01B 9/003* (2013.01); *H01B 9/02* (2013.01); *H04B 3/542* (2013.01);

(Continued)

(58) Field of Classification Search
CPC . H05B 6/04; H05B 6/06; H05B 6/062; H05B 6/065; H05B 6/08; H05B 6/101;
(Continued)

(56) References Cited

U.S. PATENT DOCUMENTS

| | | | | |
|---|---|---|---|---|
| 5,450,305 A | * | 9/1995 | Boys ........................ | G05F 1/13 |
| | | | | 219/624 |
| 5,703,459 A | * | 12/1997 | Yasohara .............. | H02P 29/027 |
| | | | | 318/758 |

(Continued)

FOREIGN PATENT DOCUMENTS

| | | |
|---|---|---|
| CN | 106493508 | 3/2017 |
| EP | 2407564 | 1/2012 |
| WO | 2016099640 | 6/2016 |

OTHER PUBLICATIONS

Int'l Search Report and Written Opinion fr PCT/US2019/023520 dated Jun. 17, 2019.

(Continued)

*Primary Examiner* — Hung D Nguyen
(74) *Attorney, Agent, or Firm* — McAndrews, Held & Malloy, Ltd.

(57) ABSTRACT

Induction heating accessories are disclosed. An example induction heating accessory comprises: a coupling circuit configured to be electromagnetically coupled to a cable carrying induction heating current; a power extraction circuit configured to extract power from the induction heating current via the coupling circuit; and circuitry configured to generate an output indicative of the induction heating current flowing through the cable based on receiving power via the induction coil.

20 Claims, 7 Drawing Sheets

(51) Int. Cl.
*H01B 9/02* (2006.01)
*H04B 3/54* (2006.01)
*H01B 9/00* (2006.01)
*H05B 6/08* (2006.01)

(52) U.S. Cl.
CPC ............... *H04B 3/546* (2013.01); *H05B 6/06* (2013.01); *H05B 6/36* (2013.01); *H04B 2203/5487* (2013.01); *H04B 2203/5491* (2013.01)

(58) Field of Classification Search
CPC .. H05B 6/102; H05B 6/36; H05B 6/42; H02J 3/54; H02J 3/542; H02J 3/546; H01B 9/003; H01B 9/02; H04B 2203/5458; H04B 2203/547; H04B 2203/5483; H04B 2203/5487; H04B 2203/5491
USPC ............. 219/600, 660–676, 130.1, 132, 136, 219/137 PS
See application file for complete search history.

(56) References Cited

U.S. PATENT DOCUMENTS

| | | | |
|---|---|---|---|
| 6,713,737 | B1 | 3/2004 | Verhagen |
| 7,208,684 | B2 | 4/2007 | Fetterolf, Sr. et al. |
| 2004/0084443 | A1 | 5/2004 | Ulrich |
| 2007/0080154 | A1 | 4/2007 | Ott |
| 2015/0122781 | A1* | 5/2015 | Albrecht .............. B23K 9/0953 219/136 |
| 2016/0107257 | A1* | 4/2016 | Denis ................... B23K 9/1087 219/132 |
| 2018/0049277 | A1 | 2/2018 | Salsich |

OTHER PUBLICATIONS

Int'l Search Report and Written Opinion for PCT/US2017/043509 dated Oct. 13, 2017.

* cited by examiner

US 10,939,507 B2

INDUCTION HEATING ACCESSORIES

RELATED APPLICATIONS

This patent is a continuation-in-part of U.S. patent application Ser. No. 15/235,383, filed Aug. 12, 2016, entitled "INDUCTION HEATING POWER SUPPLIES, DATA COLLECTION SYSTEMS, AND INDUCTION HEATING SYSTEMS TO COMMUNICATE OVER AN INDUCTION HEATING CABLE." The entirety of U.S. patent application Ser. No. 15/235,383 is incorporated herein by reference.

BACKGROUND

This disclosure relates generally to induction heating, and more particularly to induction heating accessories.

SUMMARY

Induction heating accessories are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to identify similar or identical components.

DETAILED DESCRIPTION

Figure 1:
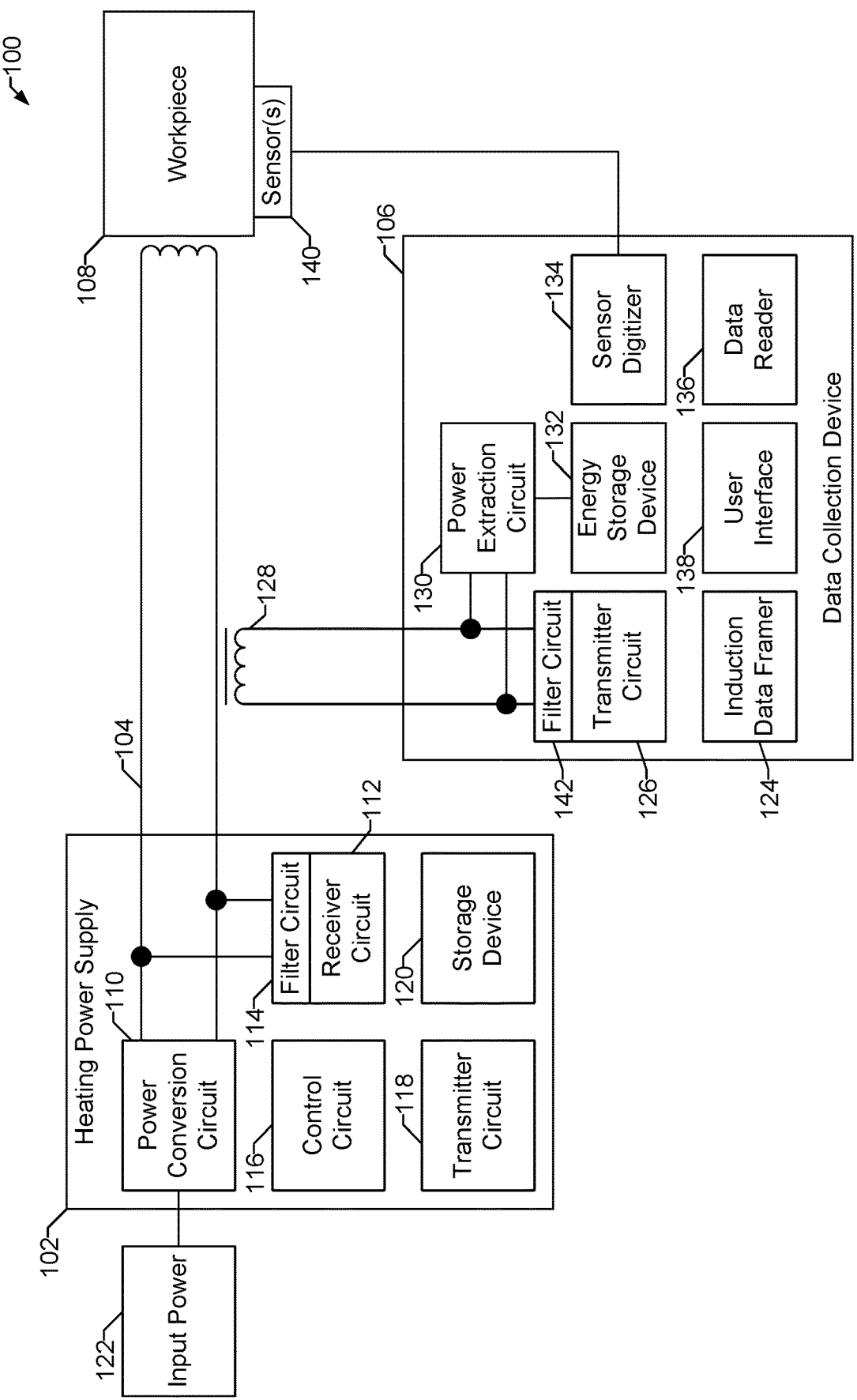
FIG. 1 shows an example induction heating system in accordance with aspects of this disclosure.

As used herein, the term "port" refers to one or more terminals(s), connector(s), plug(s), and/or any other physical interface(s) for traversal of one or more inputs and/or outputs. Example ports include weld cable connections at which a weld cable is physically attached to a device, a gas hose connector connectors that may make physical and/or electrical connections for input and/or output of electrical signals and/or power, physical force and/or work, fluid, and/or gas.

As used herein, the term "induction heating power" refers to AC electrical power capable of inducing a current in a workpiece when flowing through an appropriately arranged cable so as to heat the workpiece by magnetic induction.

As used herein, a "circuit" includes any analog and/or digital components, power and/or control elements, such as a microprocessor, digital signal processor (DSP), software, and the like, discrete and/or integrated components, or portions and/or combinations thereof.

Disclosed example induction heating power supplies include a power conversion circuit configured to convert input power into induction heating power and transmit the induction heating power via an induction heating cable, and at least one of a receiver circuit coupled to the induction heating cable and configured to receive data via the induction heating cable or a transmitter circuit coupled to the induction heating cable and configured to transmit data via the induction heating cable.

Some example induction heating power supplies further include a control circuit configured to control the power conversion circuit to modify the induction heating power based on the data. In some examples, the data includes at least one of an ambient temperature at a workpiece being heated with the induction heating cable, a temperature of the induction heating cable, a temperature of a blanket in contact with the induction heating cable, a temperature of the workpiece, a coolant temperature, a coolant pressure, a coolant flow rate, a current measurement of current flowing through the induction heating cable, a voltage measurement of a voltage at the induction heating cable, an error signal, or a control signal. In some examples, the data includes at least one of a workpiece identifier, an induction heating cable identifier, an operator identifier, date information, time information, geographic information, a cable fixture identifier, or operator input.

In some examples, the receiver circuit and/or the transmitter circuit include at least one of a high pass filter circuit or a bandpass filter circuit to attenuate the induction heating power. In some examples, the receiver circuit and/or the transmitter circuit include a low pass filter circuit to attenuate the induction heating power. Some example induction heating power supplies further include an isolation circuit to selectively electrically isolate the receiver circuit and/or the transmitter circuit based on whether the induction heating power is flowing through the induction heating cable.

Some examples further include an antenna configured to receive the data from the induction heating cable, the receiver circuit comprising a radio receiver to wirelessly receive the data via the antenna. Some examples further include a data storage device configured to store the data as the data is received at the receiver circuit. Some such examples further include a second transmitter circuit to transmit the stored data.

In some examples, the power conversion circuit, when not outputting the induction heating power via the induction heating cable, outputs a pulse via the induction heating cable, the receiver circuit configured to receive the data via the induction heating cable in response to the pulse. In some examples, the power conversion circuit provides the induction heating power via the induction heating cable for a first time period, reduces or removes the induction heating power for a second time period following the first time period, and provides the induction heating power via the induction heating cable during a third time period following the second time period. The receiver circuit receives the data during the second time period.

Disclosed example induction heating data collection devices include a transmitter circuit to transmit induction heating data via an alternating current signal at a frequency different than an induction heating current frequency on an induction heating cable, and a coupling circuit to couple the transmitter circuit to the induction heating cable.

In some examples the coupling circuit includes a current transformer magnetically coupled to the induction heating cable or a cable tap that couples the coupling circuit in parallel with an inductance of a workpiece heated by the induction heating cable. Some example induction heating data collection devices further include a filter circuit to attenuate the induction heating current frequency between the transmitter circuit and the coupling circuit. Some example induction heating data collection devices further include an energy storage device to provide power to the transmitter circuit when induction heating power is not being transmitted through the induction heating cable. Some such examples further include a power extraction circuit to extract power from the induction heating cable via the coupling circuit to charge the energy storage device.

Some example induction heating data collection devices further include a power extraction circuit to extract power from the induction heating cable via the coupling circuit and to provide power to the transmitter circuit. Some examples further include at least one of: a sensor digitizer to receive data from at least one of a temperature sensor, a coolant pressure sensor, a coolant flow sensor, or a location sensor; a data reader to read an identifier; or a user interface to receive the data. Some example induction heating data collection devices further include a receiver circuit to receive second data via the induction heating cable.

Some example induction heating systems include an induction heating cable, an induction heating data collection device, and an induction heating power supply. The induction heating cable delivers induction heating power to a workpiece according to an arrangement of the induction heating cable proximate the workpiece. The induction heating data collection device is inductively coupled to the induction heating cable proximate the workpiece, collects induction heating data corresponding to delivery of the induction heating power to the workpiece via the induction heating cable, and transmits the induction heating data via the inductive coupling and the induction heating cable. The induction heating power supply outputs the induction heating power and receives the induction heating data via the induction heating cable.

In some examples, the induction heating data includes an ambient temperature at the workpiece, a temperature of the induction heating cable, a temperature of a blanket in contact with the induction heating cable, a temperature of the workpiece, a coolant temperature, a coolant pressure, a coolant flow rate, a current measurement of current flowing through the induction heating cable, and/or a voltage measurement of a voltage at the induction heating cable, and the induction heating power supply logs the induction heating data in a storage device.

In some examples, the induction heating power supply transmits the induction heating data to a server. In some examples, the induction heating data collection device draws power from the induction heating cable. In some examples, the induction heating power supply further includes a second transmitter circuit to transmit second data via the induction heating cable, and the induction heating data collection device further includes a second receiver circuit to receive the second data via the induction heating cable.

FIG. 1 shows an example induction heating system 100. The example induction heating system 100 of FIG. 1 includes an induction heating power supply 102, an induction heating cable 104, and a data collection device 106. The induction heating power supply 102 heats a workpiece 108 by transmitting induction heating power to the workpiece 108 via the induction heating cable 104, which is arranged proximate the workpiece 108 to induce current in the workpiece 108 via magnetic induction from the current in the induction heating cable 104.

The induction heating power supply 102 supplies induction heating power to the workpiece 108 and receives data from the data collection device 106, both via the induction heating cable 104. The induction heating power supply 102 includes a power conversion circuit 110, a receiver circuit 112, a filter circuit 114, a control circuit 116, a transmitter circuit 118, and a storage device 120.

The example power conversion circuit 110 converts input power 122 into induction heating power and transmits the induction heating power via the induction heating cable 104. For example, the power conversion circuit 110 may receive utility power and/or generator power, convert the input power 122 to a frequency suitable for heating the particular type of workpiece 108, and transmit the power via the induction heating cable 104. The induction heating cable 104 includes one or more conductors for conducting current, which can be arranged proximate a workpiece to heat the workpiece by induction.

The receiver circuit 112 coupled to the induction heating cable 104 and configured to receive data via the induction heating cable 104. As disclosed in more detail below, the power conversion circuit 110 outputs the induction heating power at a first frequency and the receiver circuit 112 receives the data at a second frequency different than the first frequency. To separate the data from the induction heating power, the induction heating power supply 102 includes a filter circuit 114 that attenuates the induction heating power. The filter circuit 114 may be a high pass filter and/or a bandpass filter for data signals that are substantially higher than the induction heating power frequency. The filter circuit 114 may be a low pass filter for data signals that are substantially lower that the induction heating power frequency.

While the example filter circuit 114 is shown as directly coupled to the induction heating cable 104 in parallel with the workpiece 108, in other examples the filter circuit 114 is directly coupled in series with the induction heating cable 104, inductively coupled to the induction heating cable 104, wirelessly coupled to the induction heating cable 104, and/or directly connected to the induction heating cable 104.

The control circuit 116 controls the power conversion circuit 110 to modify the induction heating power based on data received by the receiver circuit 112. For example, the data may include one or more of an ambient temperature at the workpiece 108 (e.g., a temperature of an immediately local environment, such as air temperature around the workpiece 108) being heated with the induction heating cable 104, a temperature of the induction heating cable 104, a temperature of a blanket in contact with the induction heating cable 104, a temperature of the workpiece 108, a measurement of current flowing through the induction heating cable 104, a voltage measurement of a voltage at the induction heating cable 104 (e.g., a voltage across the portion of the induction heating cable 104 inductively coupled to the workpiece 108), and/or an error signal. Additionally or alternatively, when the induction heating cable 104 is a liquid cooled cable, the data may include one or more of a temperature of coolant flowing through the induction heating cable 104, a coolant pressure, and/or a coolant flow rate. In some examples, the data may include one or more of a workpiece identifier, an induction heating cable identifier, an operator identifier, date information, time information, geographic information, a cable fixture identifier, and/or any type of operator or user input entered at the data collection device 106.

As used herein, a "blanket" refers to an insulative layer covering the induction heating cables and which protect the cables. As used herein, the term "identifier" may include a serial number, a model number, or any other identification value, and which may be expressed as a quick read (QR) code, a bar code, a human readable number, a radio frequency identification (RFID) tag, and/or any other machine readable indicia.

The control circuit 116 may control the power conversion circuit 110 based on the data to, for example, increase and/or decrease the induction heating power output, stop and/or start the induction heating power output, modify the frequency of the induction heating power output, and/or perform any other control or modification.

The transmitter circuit 118 transmits some or all of the received data to, for example, a local or remote storage device, a local or remote server, and/or any other device. An example recipient of the transmission of the data may be, for example, a computer or a server configured with Insight® software sold by Miller Electric®. Additionally or alternatively, the storage device 120 stores the received data for later retrieval and/or transmission by the transmitter circuit 118. The example transmitter circuit 118 may include a wireless communications transmitter (e.g., cellular, Long Term Evolution (LTE), WiFi, Bluetooth®, etc.) and/or a wired communications transmitter (e.g., Ethernet, CAN, USB etc.). The example storage device 120 may be an integrated storage device such as a hard drive, solid state storage, or memory device, or a removable storage device such as a USB drive or other connected storage.

The example transmitter circuit 118 and the example receiver circuit 112 may communicate using any appropriate modulation scheme. By way of example, the transmitter circuit 118 and the example receiver circuit 112 may communicate using Orthogonal Frequency Division Multiplexing (OFDM), Quadrature Amplitude Modulation (QAM), Frequency Shift Keying, and/or any other analog, digital, and/or spread spectrum modulation schemes, and/or any combination of modulation schemes. Example techniques that may be implemented by the transmitter circuit 118 and/or the receiver circuit 112 are described by Yonge et al., "An Overview of the HomePlug AV2 Technology," Journal of Electrical and Computer Engineering, Volume 2013, the entirety of which is incorporated herein by reference. However, other techniques may be used by either the transmitter circuit 118 or the receiver circuit 112.

The example induction heating data collection device 106 includes an induction data framer 124, a transmitter circuit 126, a coupling circuit 128, a power extraction circuit 130, an energy storage device 132, a sensor digitizer 134, a data reader 136, and a user interface 138.

The induction data framer 124 frames induction heating data for transmission via the induction heating cable 104. The induction heating data may be generated from sensor data collected by one or more sensors 140 and converted to digital data via the sensor digitizer 134, received from the data reader 136, and/or input by a user or operator via the user interface 138. The example sensor(s) may include 140 a temperature sensor (e.g., a thermocouple, a thermistor, a resistive temperature device, an infrared sensor, etc.), a coolant pressure sensor, or a coolant flow sensor, and/or a location sensor. Example induction heating data includes one or more of an ambient temperature at the workpiece 108 being heated with the induction heating cable 104, a temperature of the induction heating cable 104, a temperature of a blanket in contact with the induction heating cable 104, a temperature of the workpiece 108, a measurement of current flowing through the induction heating cable 104, a voltage measurement of a voltage at the induction heating cable 104 (e.g., a voltage across the portion of the induction heating cable 104 inductively coupled to the workpiece 108), an error signal, a temperature of coolant flowing through the induction heating cable 104, a coolant pressure, a coolant flow rate, a workpiece identifier, an induction heating cable identifier, an operator identifier, date information, time information, geographic information, a cable fixture identifier, and/or any type of operator or user input entered at the data collection device 106.

The example data reader 136 may be a e.g., RFID reader, barcode scanner, QR code scanner, and/or any other type of data reader 136. The example user interface 138 may include any type(s) of user interface devices, such as selection buttons, switches, dials, number pads, touchscreens, and/or any other type of user interface device.

The example transmitter circuit 126 transmits the induction heating data via an AC signal, using a frequency different than an induction heating current frequency, on the induction heating cable 104 (e.g., output by the induction heating power supply 102). The example transmitter circuit 126 is coupled to the induction heating cable 104 via the coupling circuit 128 and a filter circuit 142. The filter circuit 142 enables the frequency transmitted by the transmitter circuit 126 to be output to the coupling circuit 128 while attenuating the frequencies of the induction heating power. The example coupling circuit 128 of FIG. 1 includes a current transformer magnetically coupled to the induction heating cable 104.

The power extraction circuit 130 extracts power from the induction heating cable 104 via the coupling circuit 128 to power the transmitter circuit 126, the induction data framer 124, the sensor digitizer 134, the data reader 136, and/or the user interface 138, and/or to charge the energy storage device 132. The example energy storage device 132 provides power to the transmitter circuit 126, the induction data framer 124, the sensor digitizer 134, the data reader 136, and/or the user interface 138 when the power extraction circuit 130 is not capable of powering the components. The example energy storage device 132 may include one or more batteries, one or more capacitors, and/or any other type of energy storage device.

In some examples, the data collection device 106 can be powered by the induction heating power supply 102 to enable the data collection device 106 to collect and/or send data while induction heating power is not being applied to the induction heating cable 104. The power conversion circuit 110 may output a pulse via the induction heating cable 104 to power the data collection device 106. After outputting the pulse, the power conversion circuit 110 turns off the power and the receiver circuit 112 receives data transmitted from the data collection device via the induction heating cable 104 in response to the pulse.

In some examples, the induction heating power supply 102 provides intermittent power to heat the workpiece 108 and, while not providing power, receives the data at the receiver circuit 112. In some such examples, communication only occurs when the induction heating power supply 102 is not outputting induction heating power, and the control circuit 116 implements logic to connect or enable the receiver circuit 102 to receive communications when the power supply 102 is not providing heating power. For example, the power conversion circuit 110 outputs the induction heating power via the induction heating cable 104 for a first time period, reduces or removes the induction heating power for a second time period following the first time period, outputs the induction heating power again during a third time period following the second time period, and so on. The receiver circuit 112 receives the data during the second time period. In some examples, instead of or in addition to including the filter circuit 114 to couple the receiver circuit 112 to the induction heating cable 104, the induction heating power supply 102 includes a relay, a contactor, or another type of isolation device to selectively connect and disconnect the receiver circuit 112 from the induction heating cable 104. The control circuit 116 coordinates the power conversion circuit 110 and the isolation device to connect the receiver circuit 112 when the power conversion circuit 110 is not outputting the induction heating power and to disconnect the receiver circuit 112 when the power conversion circuit 110 is outputting the induction heating power.

Conversely, the example heating power supply 102 may be configured to enable and/or connect the receiver circuit 112 to receive the data when the induction heating power supply 102 is outputting induction heating power, and the control circuit 116 implements logic to disconnect and/or disable the receiver circuit 102 when the power supply 102 is not providing heating power.

Figure 2:
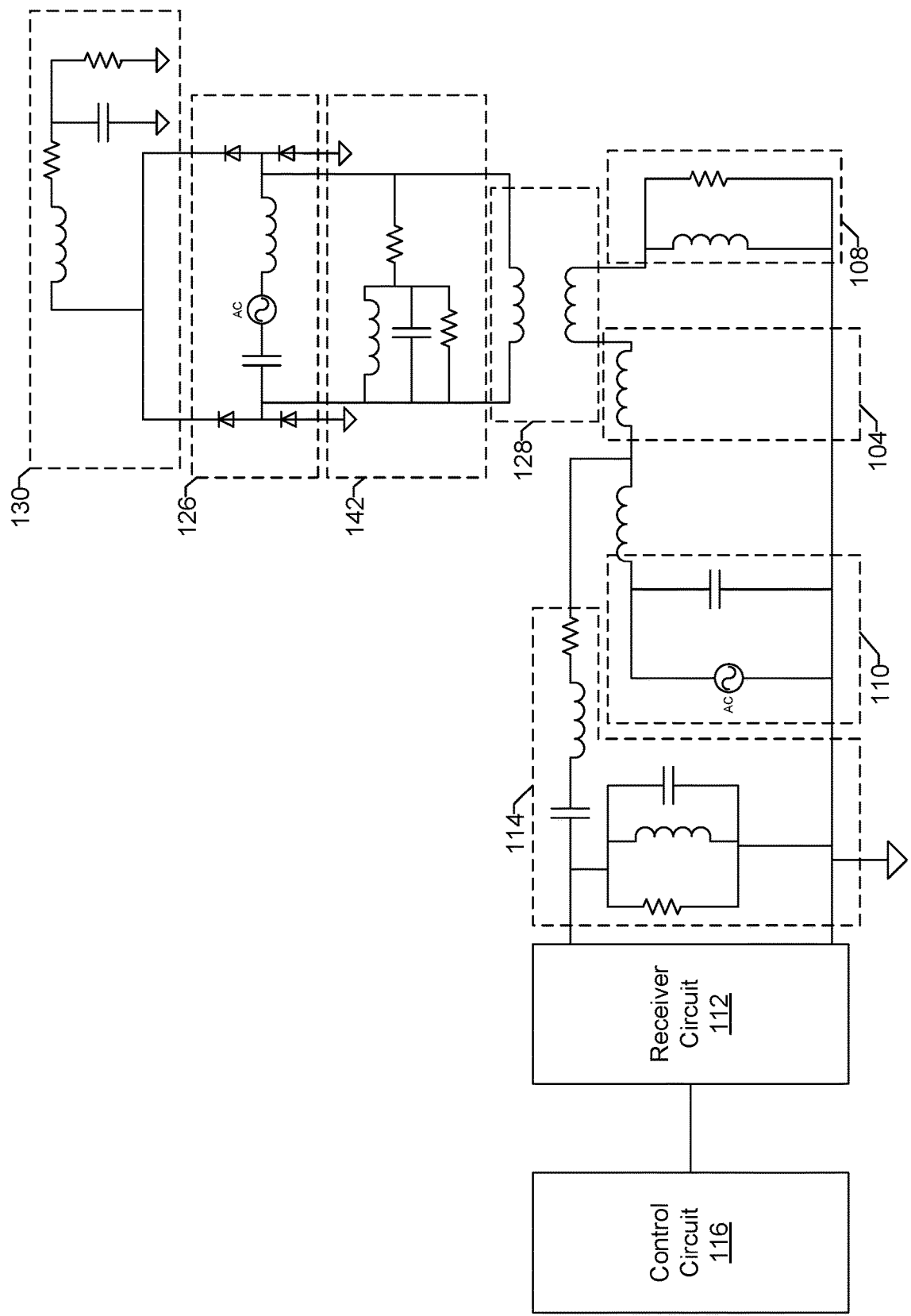
FIG. 2 is a circuit schematic diagram of an example implementation of the induction heating system of FIG. 1.

FIG. 2 is a circuit schematic diagram of an example implementation of the induction heating system 100 of FIG. 1. The circuit schematic illustrated in FIG. 2 includes example implementations or representations of the filter circuit 114, the induction heating cable 104, the transmitter circuit 126, the filter circuit 142, the power extraction circuit 130, and the coupling circuit 128.

Figure 3:
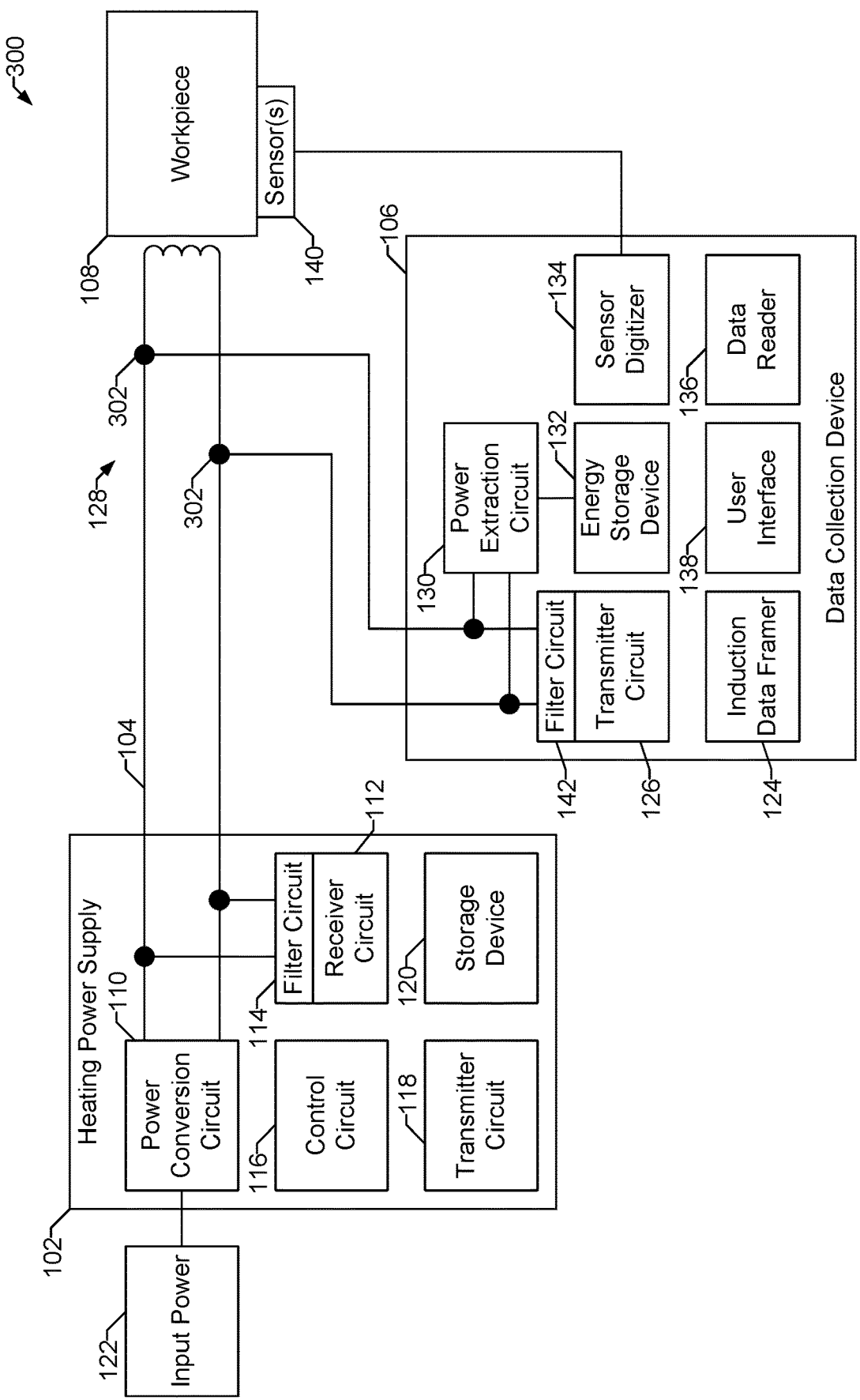
FIG. 3 shows another example induction heating system in accordance with aspects of this disclosure.

FIG. 3 shows another example induction heating system 300. In contrast with the example system 100 of FIG. 1, the system 300 of FIG. 3 implements one or more cable taps 302 in the coupling circuit 128 to couple the transmitter circuit 126 in parallel with an inductance of the workpiece 108 being heated by the induction heating cable 104.

In an example of operation of the systems 100, 300 of FIGS. 1 and/or 3, the control circuit 116 enables the power conversion circuit 110 to output the induction heating power via the induction heating cable 104 at a first frequency to heat the workpiece 108. As the induction heating power is flowing through the induction heating cable 104, the example power extraction circuit 130 extracts a portion of the induction heating power to power the induction data framer 124, the transmitter circuit 126, the sensor digitizer 134, the data reader 136, and/or the user interface 138, and/or to power the energy storage device 132. The sensor digitizer 134 digitizes signals received from the sensor(s) 140 (e.g., a voltage signal from a thermocouple measuring the temperature of the workpiece 108 as the workpiece 108 is heated) and provides the signals to the transmitter circuit 126. The transmitter circuit 126 transmits the data from the sensor digitizer 134 at a frequency different than the frequency of the induction heating power. For example, the transmitter circuit 126 may transmit the data at a frequency several orders of magnitude higher than the frequency of the induction heating power. The filter circuit 114 permits the transmitted data to be received at the receiver circuit 112, which reads the data from the induction heating cable 104. The receiver circuit 112 may store the data in the storage device 120, provide the data to the transmitter circuit 118 for transmission to a data collection server (or other device), and/or provide the data to the control circuit 116 for controlling the induction heating.

In some examples, the data collection devices 106 of FIGS. 1 and/or 3 can be powered by the induction heating power supply 102 to enable the data collection device 106 to collect and/or send data while induction heating power is not being applied to the induction heating cable 104. The power conversion circuit 110 may output a pulse via the induction heating cable 104 to power the data collection device 106. After outputting the pulse, the power conversion circuit 110 turns off the power and the receiver circuit 112 receives data transmitted from the data collection device via the induction heating cable 104 in response to the pulse.

In some examples, the induction heating power supply 102 provides intermittent power to heat the workpiece 108 and, while not providing power, receives the data at the receiver circuit 112. For example, the power conversion circuit 110 outputs the induction heating power via the induction heating cable 104 for a first time period, reduces or removes the induction heating power for a second time period following the first time period, outputs the induction heating power again during a third time period following the second time period, and so on. The receiver circuit 112 receives the data during the second time period. In some examples, instead of or in addition to including the filter circuit 114 to couple the receiver circuit 112 to the induction heating cable 104, the induction heating power supply 102 includes a relay, a contactor, or another type of isolation device to selectively connect and disconnect the receiver circuit 112 from the induction heating cable 104. The control circuit 116 coordinates the power conversion circuit 110 and the isolation device to connect the receiver circuit 112 when the power conversion circuit 110 is not outputting the induction heating power and to disconnect the receiver circuit 112 when the power conversion circuit 110 is outputting the induction heating power.

Figure 4:
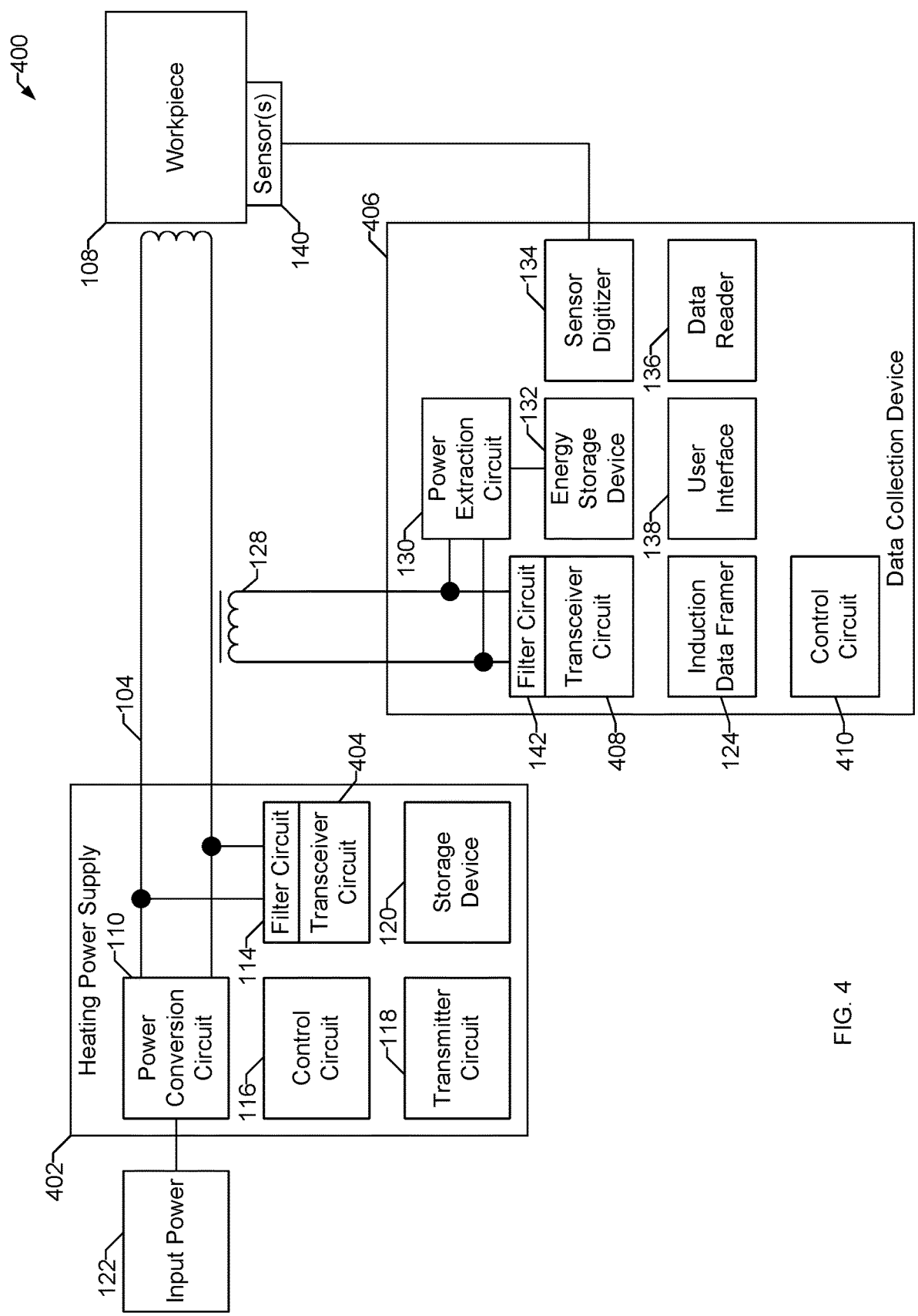
FIG. 4 is a block diagram of another example heating system that includes a heating power supply having a transceiver circuit, and a data collection device that includes a transceiver circuit.

FIG. 4 is a block diagram of another example heating system 400 that includes a heating power supply 402 having a transceiver circuit 404, and a data collection device 406 that includes a transceiver circuit 408. The example heating power supply 402 includes the power conversion circuit 110, the filter circuit 114, the control circuit 116, the transmitter circuit 118, and/or the storage device 120 as described above. The example data collection device 406 includes the induction data framer 124, the power extraction circuit 130, the energy storage device 132, the sensor digitizer 134, the data reader, the user interface 138, and/or the filter circuit 142 of FIGS. 1 and/or 3.

In contrast with the example heating power supplies 102 of FIGS. 1 and 3, the heating power supply 402 is also capable of transmitting data via the induction heating cable 104 to the data collection device 406 (e.g., bidirectional communication between the heating power supply 402 and the data collection device 406). In addition to the example data transmitted by the data collection device to the heating power supply 402 via the induction heating cable 104, the heating power supply 402 may transmit data, such as control or configuration data, to the data collection device 406 for implementation by a control circuit 410 at the data collection device 406. Additionally or alternatively, the heating power supply 402 may transmit handshake information for use in negotiating the connection with the data collection device 406.

Figure 5:
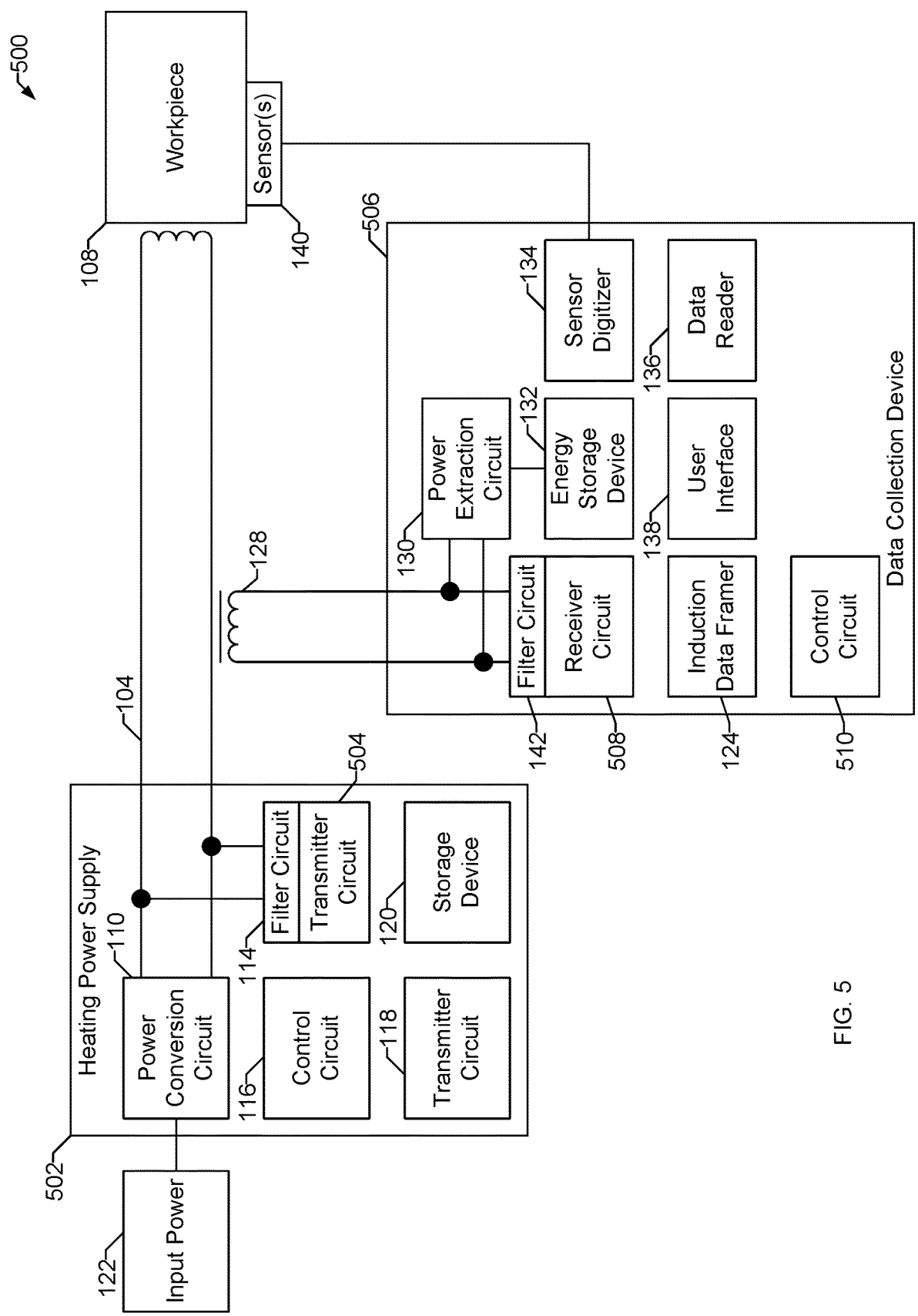
FIG. 5 is a block diagram of another example heating system that includes a heating power supply having a transmitter circuit, and a data collection device that includes a receiver circuit and a control circuit.

FIG. 5 is a block diagram of another example heating system 500 that includes a heating power supply 502 having a transmitter circuit 504, and a data collection device 506 that includes a receiver circuit 508 and a control circuit 510. The example transmitter circuit 504 may be similar or identical to the transmitter circuit 126 of FIGS. 1 and/or 3, but is implemented in the heating power supply 502 for transmission of control and/or configuration information to the data collection device 506. Conversely, the receiver circuit 508 may be similar or identical to the receiver circuit 112 of FIGS. 1 and/or 3, but is implemented in the data collection device 506 to receive data from the heating power supply 502 via the induction heating cable 104.

The example systems 400, 500 of FIGS. 4 and/or 5 may be modified according to any of the modifications discussed above with reference to FIGS. 1, 2, and/or 3.

While the above examples are described with reference to induction heating, the examples may be modified to be used for resistive heating, in which a heating cable provides electrical power to a heating element (or serves as the heating element) which is heated via I$^2$R heating and thermally coupled to a workpiece to be heated. The examples described above may be modified to communicate via the resistive heating cable based on the application heating power and/or heating frequencies in the heating cable.

Figure 6:
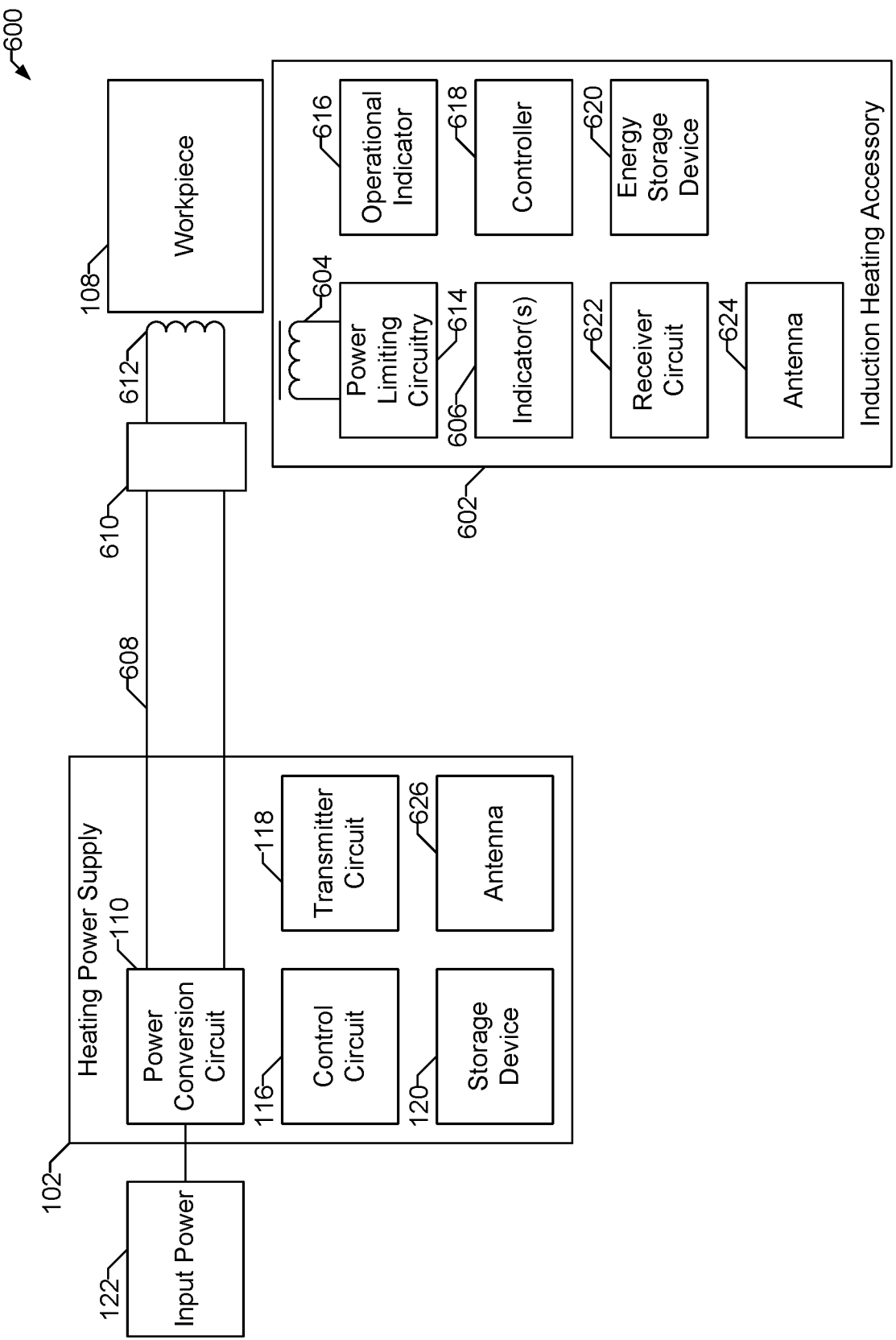
FIG. 6 shows another example induction heating system including an induction heating accessory configured to indicate the presence of induction heating power, in accordance with aspects of this disclosure.

FIG. 6 shows another example induction heating system 600 including an induction heating accessory 602 configured to indicate the presence of induction heating power. Inductive heating of a workpiece is not readily detectable by visual inspection. Moreover, disconnection of induction heating cables (e.g., breaking of an induction heating circuit) during active induction heating can lead to substantial equipment damage. The example induction heating accessory 602 provides one or more indicators to alert operators as to the presence of active induction heating power.

The example induction heating accessory 602 includes an induction coil 604 and one or more indicator(s) 606. The induction coil 604 serves as a pickup coil to extract power from the magnetic fields generated near the induction heating cables. The example induction coil 604 of FIG. 6 is an air core pickup coil. However, the example induction coil 604 may be replaced with a current transformer and/or any other type of induction coil that may extract power from the magnetic fields. In the example of FIG. 6, the induction heating cables include one or more extension cables 608, a connector 610, and an induction heating blanket 612. The induction heating blanket 612 is magnetically coupled to the workpiece 108 to heat the workpiece 108. The extension cables 608 extend from the location of the heating power supply 102 to the connector 610, which couples the extension cables 608 to the induction heating blanket 612.

The induction coil 604 of the induction heating accessory 602 may be magnetically coupled to any of the extension cables 608, the connector 610, or the induction heating blanket 612. In some examples, the induction heating accessory 602 (e.g., a housing 614 holding the induction coil 604) is positioned near the connector 610 between or adjacent windings of the induction heating blanket 612 (e.g., in the presence of strong magnetic field lines). In some other examples, the induction heating accessory 602 (e.g., a housing 614 holding the induction coil 604) is positioned on the workpiece 108 adjacent one or more windings of the induction heating blanket 612.

The example indicator 606 may be a visual indicator (e.g., one or more LEDs, incandescent lights, and/or any other light source(s) or visual indicator(s)) and/or an audio indicator (e.g., a speaker). The indicator 606 is powered by the induction coil 604 when the induction coil 604 is in the presence of sufficiently strong magnetic fields (e.g., when the induction heating accessory 602 is appropriately positioned and the power supply 102 is outputting power to the induction heating blanket 612).

Because the magnetic fields may contain substantially higher power levels than needed to power the indicator(s) 606, the example induction heating accessory 602 includes power limiting circuitry 614. The power limiting circuitry 614 limits the voltage(s) and/or current(s) supplied to the indicator(s) 606 to reduce or eliminate potential damage form providing excess power to the indicator(s) 606. The power limiting circuitry 614 may have complexity based on the range of magnetic fields (e.g., induction heating currents and/or voltages) to which the induction heating accessory is expected to be exposed. An example implementation of the induction coil 604, the indicator(s) 606, and the power limiting circuitry 614 is described below with reference to FIG. 7.

Because the indicator(s) 606 does not make an indication when induction heating power is not being provided to the induction heating blanket 612 and when the indicator(s) 606 is inoperative (e.g., damaged or otherwise unable to provide an output indication), the example induction heating accessory 602 may further include an operational indicator 616 configured to output a separate indication that the indicator(s) 606 are operative. For example, a controller 618 may periodically test the indicator(s) 606 and/or the power limiting circuitry 614 to verify operation. The induction heating accessory 602 may include an energy storage device 620 to provide power to the controller 618 and/or the operational indicator 616.

In some examples, the indicator(s) 606 include a receiver circuit 622 coupled to an antenna 624. The heating power supply 102 may also include an antenna 626 to enable the transmitter circuit 118 to transmit a signal to the receiver circuit 622 when the power conversion circuit 110 is outputting induction heating power. When the heating power supply 102 is outputting power, the transmitter circuit 118 outputs the signal and the magnetic coil 604 provides power to the receiver circuit 622 to enable the receiver circuit 622 to process the incoming signal from the heating power supply 102 and to power the indicator(s) 606 based on the received signal.

Figure 7:
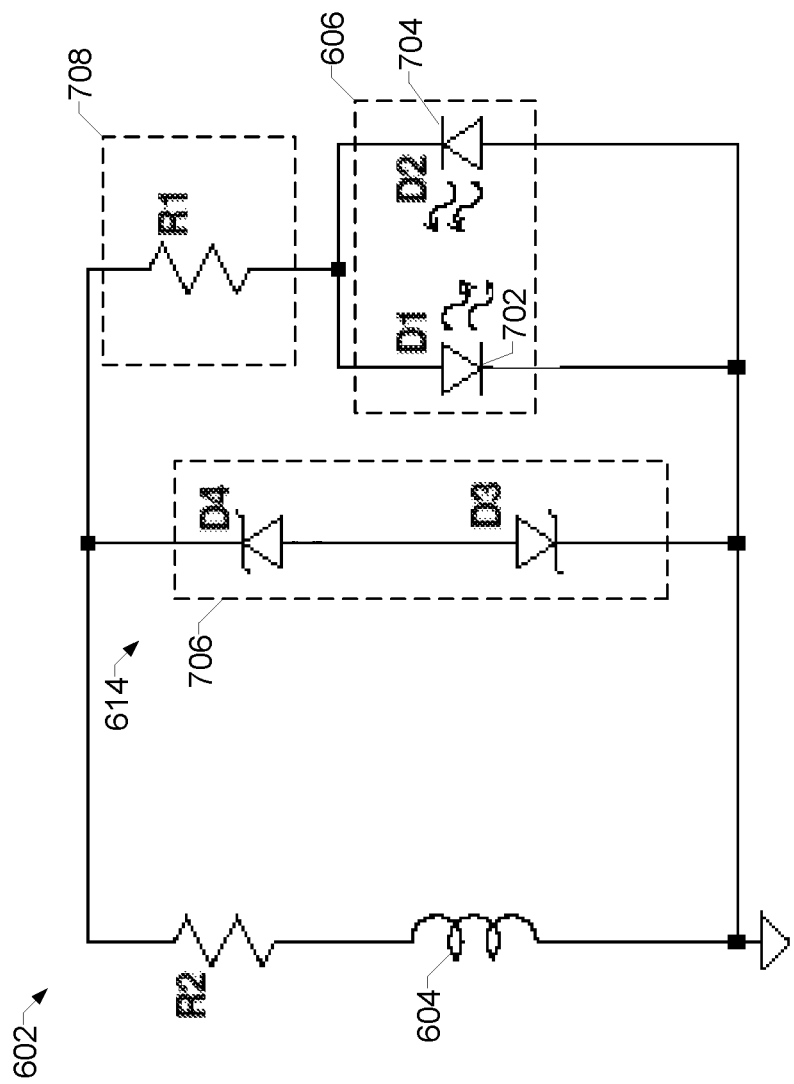
FIG. 7 is a schematic diagram of an example implementation of the induction heating accessory of FIG. 6.

FIG. 7 is a schematic diagram of an example implementation of the induction heating accessory 602 of FIG. 6. The example induction heating accessory 602 includes the induction coil 604, the indicator 606, and the power limiting circuitry 614. The induction coil 604 supplies an AC voltage based on the magnetic field generated via the extension cables 608, the connector 610, or the induction heating blanket 612. The indicator 606 includes two anti-parallel LEDs 702, 704, such that AC power generated in the circuit by the induction coil 604 powers at least one of the LEDs 702, 704 at a given time.

The example power limiting circuitry 614 includes a voltage limiting circuit 706 and a current limiting circuit 708. The example voltage limiting circuit 706 limits an upper voltage supplied to the indicator 606 (e.g., to the LEDs 702, 704). The voltage limiting circuit 706 includes two Zener diodes with the cathodes coupled in series. The example current limiting circuit 708 limits an upper current supplied to the indicator 606 (e.g., to the LEDs 702, 704). The current limiting circuit 708 includes one or more resistors. The example power limiting circuitry 614 may be tuned based on the magnetic fields expected to be encountered by the induction coil 604. As the range of magnetic fields increases, the complexity and/or performance of the power limiting circuitry 614 may similarly increase.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An induction heating accessory, comprising:
   a coupling circuit configured to be electromagnetically coupled to a cable carrying induction heating current;
   a power extraction circuit configured to extract power from the induction heating current via the coupling circuit;
   a receiver circuit operably coupled with a filter circuit and configured to receive data from the cable via an alternating current signal at a frequency that is different than an induction heating current frequency of the induction heating current; and
   circuitry configured to generate an output indicative of the induction heating current flowing through the cable based on receiving power from the cable via the coupling circuit.

2. The induction heating accessory as defined in claim 1, wherein the circuitry comprises an indicator configured to generate an audible or visual output in response to at least a threshold induction heating current.

3. The induction heating accessory as defined in claim 2, wherein the indicator comprises a set of anti-parallel light emitting diodes (LEDs).

4. The induction heating accessory as defined in claim 2, wherein the indicator comprises a speaker.

5. The induction heating accessory as defined in claim 1, wherein the filter circuit is configured to attenuate the induction heating current frequency between the receiver circuit and the coupling circuit.

6. An induction heating accessory, comprising:
   an induction coil configured to generate a first alternating current in a presence of induction heating magnetic fields;
   power limiting circuitry configured to convert the first alternating current to a second alternating current;
   an energy storage device operatively coupled to the power limiting circuitry and configured to store power received via the induction coil; and
   an indicator configured to generate an audible or visual output in response to at least a threshold alternating current from the power limiting circuitry.

7. The induction heating accessory as defined in claim 6, further comprising a housing configured to contain at least one of the induction coil, the power limiting circuitry, or the indicator.

8. The induction heating accessory as defined in claim 7, wherein the housing is configured to be coupled to at least one of an induction heating blanket, an induction heating extension cable, or an induction heating cable connector.

9. The induction heating accessory as defined in claim 7, wherein the housing is configured to be coupled to a workpiece.

10. The induction heating accessory as defined in claim 6, wherein the indicator comprises one or more lights.

11. The induction heating accessory as defined in claim 6, wherein the indicator comprises a speaker.

12. The induction heating accessory as defined in claim 6, wherein the induction coil, the power limiting circuitry, and the indicator are configured to generate the audible or visual output when induction heating power is present in an induction heating device proximate the induction heating accessory.

13. The induction heating accessory as defined in claim 6, wherein the power limiting circuitry comprises a voltage limiting circuit configured to limit an upper voltage supplied to the indicator.

14. The induction heating accessory as defined in claim 6, wherein the power limiting circuitry comprises a current limiting circuit configured to limit an upper current supplied to the indicator.

15. The induction heating accessory as defined in claim 6, further comprising an antenna, wherein the indicator comprises a wireless receiver circuit configured to activate a visual indicator or an audio indicator in response to receiving both of power from the power limiting circuitry and a wireless signal from an antenna.

16. The induction heating accessory as defined in claim 6, further comprising
   an operational indicator configured to provide an indication that the indicator is operable in response to at least a threshold alternating current from the power limiting circuitry.

17. An induction heating accessory for a heating power supply, comprising:
   an induction coil configured to generate a first alternating current in a presence of induction heating magnetic field;
   power limiting circuitry configured to convert the first alternating current to a second alternating current;
   an energy storage device operatively coupled to the power limiting circuitry and configured to store power received via the induction coil;
   a receiver circuit configured to receive a signal from a transmitter circuit of the heating power supply when the heating power supply outputs induction heating power; and
   one or more indicators operably coupled to the receiver circuit and the power limiting circuitry, wherein the one or more indicators are configured to generate an audible or visual output in response to the signal or at least a threshold alternating current from the power limiting circuitry.

18. The induction heating accessory as defined in claim 17, wherein the power limiting circuitry comprises a voltage limiting circuit electrically in parallel with the induction coil and configured to limit an upper voltage supplied to the indicator, wherein the voltage limiting circuit comprises two diodes coupled in series.

19. The induction heating accessory as defined in claim 17, wherein the power limiting circuitry comprises a current limiting circuit electrically in parallel with the induction coil and configured to limit an upper current supplied to the indicator, wherein the current limiting circuit comprises one or more resistors.

20. The induction heating accessory as defined in claim 17, wherein the one or more indicators comprise a set of anti-parallel light emitting diodes (LEDs) electrically in parallel with the induction coil.

* * * * *